Aug. 15, 1933.          H. J. MURRAY          1,922,493
STEERING WHEEL ASSEMBLY
Filed April 7, 1931
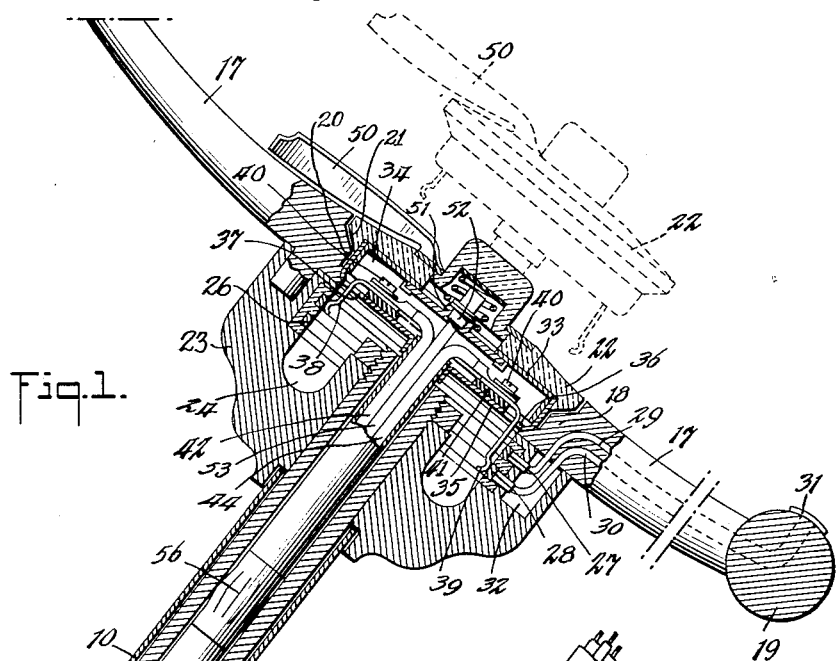
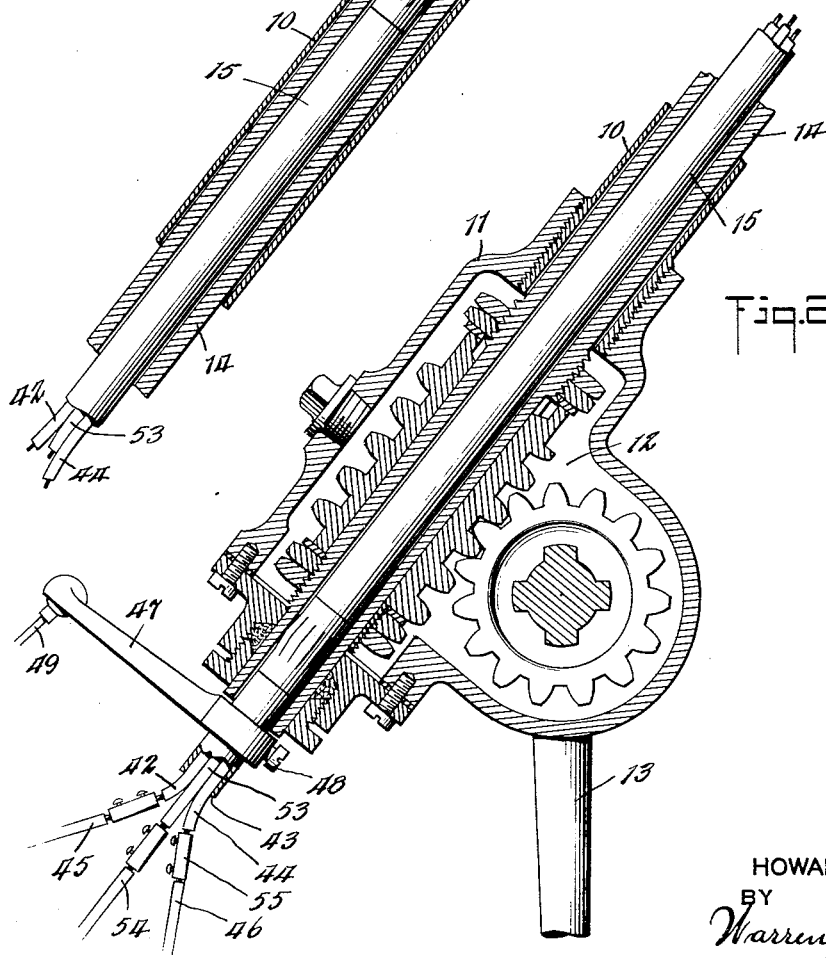
INVENTOR
HOWARD J. MURRAY
BY
Warren S. Orton
ATTORNEY Patented Aug. 15, 1933

1,922,493

UNITED STATES PATENT OFFICE 1,922,493

STEERING WHEEL ASSEMBLY

Howard J. Murray, New York, N. Y., assignor to R. M. Company, Inc., East Pittsburgh, Pa., a Corporation of Delaware Application April 7, 1931. Serial No. 528,360

11 Claims. (Cl. 200—59)

The invention relates in general to a vehicle steering wheel assembly of general application and the invention is particularly applicable to the steering mechanism of an automotive vehicle of the type which include control devices such as spark controls which extend through the steering columns.

More specifically defined, the invention relates to the construction of the steering column and associated parts of a vehicle equipped with electrical direction and warning signals, the switches and the controls of which are located on the steering wheel.

In similar constructions now known, difficulty is experienced in replacing the damaged or worn parts which go to make up the electric circuits, particularly those parts which are carried by the steering column. It has been a known practice to position electric leads forming part of the signal devices between the fixed steering post and the rotatable steering column but such constructions have a resulting tendency to abrade or wear away the electric leads by the rubbing of the same between these two members of the steering column assembly, and thus short or ground portions of the electric circuit with the possibility of the signal devices functioning wrongly.

Accordingly, the primary object of the present disclosure is to provide a simplified and improved form of steering column assembly which would avoid the disadvantages inherent in similar known structures, and in general to provide a form of construction which will permit ready access to the electrical parts for repair, inspection and replacement; to provide a construction which will house and conceal all the electrical parts except the manually actuated control switches; which will provide for an easy connection with the electric leads which form the stationary parts thereof, which will eliminate any possibility of abrading the electric leads and in general to attain these advantages with the least possible distortion or change of the conventional parts of such constructions as are now in general use.

Broadly, these objects are attained in one form of the invention by protecting certain of the electric leads as fixed elements secured to and disposed in a housing shell or sleeve which itself constitutes a replaceable unit forming part of the usual automotive vehicle steering mechanism and which leads are arranged so as to be easily connected to the remaining parts of the electric system of which they form a part.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing, there is disclosed a conventional form of steering column assembly with parts broken away, shown in axial section and provided with a preferred embodiment of the invention and in which Fig. 1 shows in full line the upper steering wheel portion of the construction; and Fig. 2 shows the lower portion usually positioned at and below the floor of the vehicle.

In the drawing and referring first to the conventional parts there is disclosed as stationary structural parts of a vehicle, a fixed steering post 10 the lower end of which is secured to a housing 11 containing a steering worm and gear connection 12 for actuating the radius rod 13 through the rotation of steering column 14 as is well known in such constructions. The steering post 10 constitutes the outer of three tubular members of which the steering column 14 constitutes the intermediate member and a hollow control shaft 15 constitutes the innermost member. The shaft 15 extends beyond opposite ends of the steering column for a reason hereinafter described and together with the steering column is mounted for independent rotary movement about a common axis which is also the axis of the fixed steering post.

The steering column 14 is provided at its upper end with a steering wheel 16 of which two spokes 17 are shown in Fig. 1. The spokes connect a hub 18 with the rim 19. The hub of the wheel is provided at its center with an opening 20 extending therethrough and outlined by a beveled seat 21 for receiving a closure cap 22 hereinafter described. A spider 23 is secured to the upper end of the steering column and to the underside of the hub of the wheel as is usual in such constructions. The spider 23 is provided with an open top annular recess 24 aligned with and forming a continuation of the opening 20 through the wheel hub whereby access is provided to this recess through the top of the steering wheel hub when the closure cap is removed. Inset within the outer wall 25, outlining the recess 24, is a ring 26 of insulating material. This ring has inset therein two axially spaced metallic annular contact rings 27 and 28 forming elements of a pair of sliding contacts, which form part of two electric circuits hereinafter more fully described. Positioned in the wheel and extending through one of the spokes thereof are two leads 29 and 30 which extend from one or more manually controlled switches indicated at 31 and which switch may be assumed to be of the type shown in Patent Number 1,704,710 issued March 12, 1929. The leads 29 and 30 inwardly towards the hub are bent downwardly at their inner ends, extend into a recess 32 in the upper face of the spider and are connected respectively to the rings 27 and 28. From this construction it is seen that a part of one electric circuit extends from a control switch or circuit closer through lead 29 to ring contact 27 and the other circuit includes lead 30 similarly extending from a control switch to the ring contact 28 and that these parts of the circuit can be regarded as permanent structural parts of the vehicle. As these parts do not contain any movable elements beyond the manual control switches they are not subjected to wear and will ordinarily last as long as the other fixed structural parts of the vehicle.

The underside of the cap 22 is centrally recessed and in this recess is positioned an inverted two part metallic casing 33 with interfitting telescoped flanges and forming a hollow space 34 therein. The lower part or inverted top 35 is provided with a pair of diametrically opposed openings 36 and 37. A pair of L-shaped spring contacts 38 and 39 have their upper ends contained in the space 34 and are secured to the casing part 35 by binding screws 40. Washers 41 of insulating material insulate the spring contacts from the metallic casing. The lower portions of the spring contacts depend through the openings 36 and 37, which extend parallel to the axis of the shaft 15 constituting spring contact elements of somewhat conventional form in electric sliding contacts. The member 38 is relatively short and is in bearing engagement with the exposed inner periphery of the annular contact ring 27 and member 39 is relatively long and is disposed similarly in bearing electric contact with the ring 28.

From this construction it is seen that except for the switch 31, all parts of the electric elements contained in the steering wheel are fixed in place and are not subjected to any wearing action except at the contact rings which are designed to withstand the frictional rubbing thereon of the spring contacts.

The upper end of shaft 15 is secured to the casing member 33 and openings into the space 34. From this construction it is seen that the shaft 15 is a more or less fixed part of the closure cap 22 and forms part of the replaceable unit featured in this disclosure. An electric lead 42 extends from the contact 38 through the interior of shaft 15 and projects for a short distance beyond the lower end 43 of this shaft, as more particularly shown at the lower end of Fig. 2. Similarly, a lead 44 extends from contact 39 through tube 15 and likewise projects out of its lower end. The present disclosure particularly distinguishes from known devices in that both of the leads 42 and 44, and any other leads which may be included therewith in the tube 15 are fixed relative to each other and are not subjected to the usual rubbing action of one on the other as the steering assembly parts are rotated during the actuation of the vehicle. From this description it is seen that the leads 42 and 44 are fixed parts of the replaceable insert unit formed of the shaft 15 and its cap 22; that they include no relatively movable parts except at their protruding ends and have no rubbing contacts except at their spring contact ends, which like the rings are designed to withstand the wearing engagement incidental to their normal use.

It is intended that the lower end of the leads 42 and 44 be connected respectively to other leads or electrical device designed to be controlled by the construction herein illustrated. In the instant case it is assumed that the electric circuits, parts of which are herein disclosed, constitute part of right and left direction indicating devices and for the purpose of this disclosure it can be assumed that lead 42 is connected to the electric device indicated symbolically at 45 which indicates that the vehicle is turning or is about to turn to the left, and correspondingly that lead 44 is connected to an electric signalling device indicated at 46, which signals that the vehicle is turning or is about to turn to the right. It is understood, however, that there is no intent in this disclosure to limit the mechanism which is to be controlled by the switches of circuit closers at the ends of leads 29 and 30.

It is a particular feature of this disclosure that the control shaft 15 together with the closing cap 22 can be removed from and inserted axially into the steering column 14 carrying with it the contained leads such as leads 42 and 44 together with their associated elements including the sliding electric contacts 38 and 39. By reference to the position of the ghost outline of the cap shown at the top of Fig. 1, it is seen that the lifting of the cap off its seat 21 and out of the opening 20 carries with it the spring elements of the sliding contact, together with the hollow shaft 15 and its contents. This shaft is secured in place against accidental displacement by means of the usual mechanism control arm 47 secured to the shaft by screw 48. In this instance, the arm 47 will be assumed to be the arm for controlling the advancing or retarding of the spark mechanism indicated symbolically at 49, at the bottom of Fig. 2. For the purpose of rotating the shaft 15 with the limited freedom of rotary movement characterizing such shafts the cap 15 is provided with a common form of spark control lever 50.

In addition to the circuit or circuits controlled by switches or circuit closers at the rim or along the length of the spokes, as hereinbefore described, it is herein suggested that the steering structure as thus far described might be utilized additionally to carry parts of another or other circuits, such for instance as the horn or signal circuit. For this purpose the closure cap is provided centrally thereof with a spring pressed button type of circuit closer 51 to the inner contact element 52 of which a third lead 53 extends with the leads 42 and 44 axially through the tube 15 and projects beyond the lower end 43 as shown in Fig. 2. As the length of lead 53 is also designed to form a part of the attachment or replaceable unit formed by the hollow shaft 15 the lower end of the lead 53 is similarly designed to be readily attached or disconnected from its associated lead 54 in this instance assumed to lead to the horn. The connections between the leads at the lower end of the steering wheel assembly are made conventionally following approved practices in this respect and it is herein suggested that the leads be demountably connected through the agency of sleeve connectors 55. The member 15 may be simply a lead protecting tube for positioning the leads, such as leads 42, 44 and 53 through the steering column without functioning as part of a control device as shown in the preferred embodiment herein illustrated. As it is a feature of this disclosure to avoid rubbing action of the leads one on the other, care is exercised to insure a minimizing of any such action and accordingly it is assumed in the illustrated case that the leads 42, 44 and 53 fill the bore of the tube 15 and are thus held by their snug fit therein from any material freedom of relative motion.

In operation and assuming that the parts are in the position shown in full lines in Figs. 1 and 2, it will be understood that the parts operate as is usual in conventional practices in that the vehicle may be steered by the rotation of the steering wheel which will act through the hub, spider and steering column to rotate the worm gear connection as is well known in such constructions. It is also possible to advance or retard the spark or other mechanism which is intended to be controlled from the lever 50. The rotation of lever 50 rotates the cap and with it the control shaft 15, it being appreciated that column 14 and shaft 15 are free to rotate independently of each other and one mounted within the other with or without the usual friction collar 56. As the telescoped members 15, 14 and 10 have a close fit one in the other, the assembly can be made of a relatively small diameter and there has been avoided any necessity for the large space usually found in such structure between the steering column and outer fixed steering post.

Should it be desired to operate any of the direction signals or other electrical device the proper manipulation of the circuit closer or closers at the outer end of leads 29 or 30 will cause their associated devices 45 or 46 to function and this will happen irrespective of the rotative position of either the steering wheel or the control shaft 15 as the sliding contacts at 38 and 39 will maintain their respective contacting relation in all rotative positions of both the steering column and the control shaft.

Should it be desired for any reason to dismount the control shaft and its associated parts, it is simply necessary to break the connection between the leads carried by the shaft and the leads which are a stationary part of the vehicle, this being accomplished in the instant case by disconnecting the connectors 55. The control arm 47 is then released thus permitting the shaft 15 to be lifted axially out of the steering column. As the engagement between the spring contact elements 38 and 39 with their respective ring contact elements 27 and 28 are along lines parallel to the axis of the tubular members and thus along the direction of separating the shaft 15 from the steering column, it is possible to break the connection at the sliding contacts without mutilating the contact elements and without necessity of unfastening any positive connections at this point. Removing the control shaft 15 and its cap 22 exposes the ring elements of the sliding contact through the opening 20 in the wheel at its hub portion permitting inspection, repair and replacement of the ring contacts. With the closure cap removed from the wheel access is also provided to the spring contact elements and to the leads connected therewith. Removing the bottom or closure member 35 access is provided to the screws 40 and to the circuit closer 51, thus facilitating repair or replacement of these parts. With the parts repaired, replaced and restored in position in the closure, the shaft 15 may be redisposed in its position rotatively mounted in the steering column. The control arm 47 replaced to restore connection with the spark mechanism and to secure the shaft in position. The electrical connection is restored by replacing the connectors 55 and the construction is again in position ready for use.

By means of the device such as is herein disclosed there is provided a structure in which the electrical parts contained in the wheel and its hub are fixed in position, and similarly the electrical parts contained in the replaceable unit are fixed in position so that the only movable part of the electric conductors as herein shown are confined to the sliding contacts and these parts are disposed so as to be easily accessible for replacement. As the leads 42, 44 and 53 are contained within and all move bodily with the hollow control shaft 15, there has been eliminated the frictional wear on these leads present in known constructions. The presence of lead wires between the fixed steering post and the rotatable steering column has been eliminated with resulting avoidance of wear on the lead wires and the avoidance of the wires imposing a resistance to the desired freedom of rotary movement of the steering mechanism as a whole.

I claim:

1. In a vehicle steering mechanism, the combination of three telescoped tubular members, the outer member being fixed and constituting a steering post, the intermediate member mounted thereon for rotary movement and constituting a steering column provided at its upper end with a steering wheel, and the inner member mounted for limited rotary movement and constituting a control shaft projecting beyond opposite ends of the steering column, a mechanism control arm demountably secured to the lower end of the control shaft and acting to prevent accidental shifting of the control shaft axially in the steering column, said steering wheel provided with a hub having an opening extending therethrough, a spider secured to the underside of the hub and provided with an annular recess open at its top through the opening in the hub, said control shaft provided at its upper end with a cap closing the open top of the hub, two axially spaced annular contact rings carried by the spider and exposed to the inside of said recess, a pair of spring contact elements carried by and rotatable with the cap, one in bearing engagement with one of said rings, and the other in bearing engagement with the other ring and said spring contacts and rings coacting to form a pair of sliding contacts, means for forming three electric circuits, operable independent of each other, two of said circuits each including in order a lead in the steering wheel, one of said sliding contacts, and a lead extending through the control shaft, and the third circuit including a third lead extending through the control shaft and a circuit closer centered at the top of the closure cap.

2. In the steering mechanism of an automotive vehicle, the combination of two telescoped tubular members, both mounted for a limited freedom of rotary movement independent of each other and both normally restrained from relative axial movement, the outer of said members provided with a steering wheel and the inner member constituting a control shaft forming part of the power controlling mechanism of the vehicle, said steering wheel provided with a hub having an opening extending therethrough and a spider having an open top annular recess forming an axial continuation of the opening in the wheel hub and said control shaft provided with a cap for closing said opening, an electric signal device including a sliding contact disposed in the recess in the spider with one element secured to the cap and the other secured to the spider, a lead in the wheel and spider secured to the contact element carried by the spider and a lead secured to the contact element carried by the cap and extending downwardly therefrom through the control shaft.

3. In an automotive vehicle, the combination with certain stationary structural parts of the vehicle including a tubular steering column mounted for a limited freedom of rotary movement, open at opposite end and having a steering wheel secured to its upper end, a signalling device including an electric lead housed in the steering wheel and an element of a sliding contact fixedly secured to the steering wheel and movable therewith, of a replaceable unit comprising a hollow mechanism control shaft adapted to be inserted in place telescoped into the steering column through the upper open end and when in position mounted to have a limited freedom of rotary movement, a coacting element of said sliding contact fixed to said shaft movable therewith and a length of lead secured to said coacting element, extending through the shaft and protruding from its lower end when the unit is disposed in position in the steering column and means for securing the control shaft in place.

4. In a vehicle steering mechanism, the combination of two tubular members, each mounted for independent rotary movement about a common axis, one of said members constituting a steering column provided with a steering wheel, and the other member constituting a mechanism control shaft, means forming an electric circuit comprising a lead in the steering wheel, a lead in the shaft, and a separable sliding connection between the leads, comprising a contact element carried by the shaft and a coacting element carried by the steering wheel, said tubular members being axially slidable relative to each other to permit the withdrawal of one from the other, while separating the elements of the sliding contact elements.

5. In a vehicle steering mechanism, the combination of two tubular telescoped members, each mounted for limited rotary movement about a common axis, the outer member constituting a steering column provided with a steering wheel and the inner member constituting part of a vehicle control mechanism, the steering wheel having an annular recess, means forming an electric circuit including signalling means and an element of a sliding contact carried by the hub and facing said recess, said inner member provided with a head forming cap for closing the recess, said electric circuit forming means including an electric lead contained in the inner member, protected thereby and a contact element rotatable with the head, extending into the recess and having a sliding engagement with the first named contact element carried by the rotatable steering column.

6. In a vehicle steering mechanism, the combination of two tubular members in telescopic relation, each mounted for independent rotary movement about a common axis, one provided with a steering wheel and the other provided with a driving mechanism control, means forming an electric circuit including a sliding contact consisting of one element thereof secured to one of the tubular members and a coacting element thereof secured to the other tubular member, one of the elements being in bearing contact with the other, otherwise free of any connection therewith and separable along a line extending axially of the tubular members whereby in the act of withdrawing the inner member out of the outer member the circuit is broken automatically at the contact without mutilating the elements.

7. In a vehicle steering mechanism, the combination of two tubular members each mounted for independent limited rotary movement about a common axis, one of said members constituting a steering column provided with a steering wheel and the other constituting a mechanism control shaft, means forming an electric circuit including a lead in the steering wheel, a lead in the tubular control shaft and a sliding contact connecting the leads in all rotative positions of both of said members.

8. In a device of the class described, the combination of three telescoped tubular members comprising a fixed steering post, a steering column mounted for limited rotary movement in the post and a mechanism control shaft mounted for limited rotary movement in the steering column, a steering wheel secured to the steering column, means forming an electric circuit including a lead contained in the tubular control shaft, a lead contained in the steering wheel and a sliding contact connecting the leads in all rotative positions of both the steering column and the control shaft.

9. In a device of the class described, the combination with a support of two groups of tubular parts relatively separable in the direction of a common axis, one group consisting of parts permanently carried by the support and comprising a tubular steering column, a steering wheel secured thereto and part of an electric circuit including a lead in the wheel and an element of a sliding contact carried by the wheel, and the other group constituting a replaceable unit comprising a tubular shaft insertable in the tubular steering column and provided with an electric lead and a coacting element of said sliding contact and said contacts separable automatically as the replaceable unit is withdrawn from the steering column.

10. In a device of the class described, the combination of a steering column, open at one end, a tube telescopically inserted into said column through said open end and mounted therein for rotary movement and means forming an electric circuit including a sliding contact with one element thereof secured to the steering column and the other element secured to the rotative tube thereby to maintain electric contact in all relative rotative positions of both the tube and steering column, said elements contacting along a line extending in the direction of separating movement of the tube when withdrawn from the steering column whereby the elements are separated automatically when the tube is withdrawn from the column.

11. A steering wheel assembly provided with means adapted to form part of an electric circuit, said means including a pair of sliding contacts, said assembly including a steering column provided with a steering wheel and a readily replaceable unit including a tubular member telescoped in the steering column, said circuit forming means including a lead having one of said sliding contacts fixedly attached thereto and said lead extending through the tubular member, said lead with its attached sliding contact carried by and forming a fixed part of the removable unit and said sliding contacts being separable automatically from each other and thus breaking the circuit of the contacts incidental to the withdrawal of the unit from the steering column,

HOWARD J. MURRAY.